United States Patent [19]

Inoue et al.

[11] Patent Number: 5,159,509
[45] Date of Patent: Oct. 27, 1992

[54] MAGNETIC HEAD CARRIAGE DEVICE FOR MAGNETIC DISK DRIVE

[75] Inventors: Kazuhiko Inoue, Houya; Yoshio Hirose, Urawa, both of Japan

[73] Assignee: Teac Corporation, Japan

[21] Appl. No.: 638,053

[22] Filed: Jan. 4, 1991

[30] Foreign Application Priority Data

Sep. 21, 1990 [JP] Japan .................................. 2-253861

[51] Int. Cl.⁵ .......................... G11B 17/32; G11B 5/48
[52] U.S. Cl. .................................................... 360/104
[58] Field of Search ....................... 360/104, 105, 106

[56] References Cited

U.S. PATENT DOCUMENTS

| | | | |
|---|---|---|---|
| 4,774,614 | 9/1988 | Murakami et al. | 360/106 |
| 4,853,813 | 8/1989 | Yamanouchi | 360/104 |
| 4,881,142 | 11/1989 | Kato et al. | 360/106 |

*Primary Examiner*—David J. Severin
*Attorney, Agent, or Firm*—Andrus, Sceales, Starke & Sawall

[57] ABSTRACT

A magnetic head carriage device which comprises a head carriage body provided on a magnetic disk drive apparatus slidably in a radial direction of a magnetic disk and in parallel to a guiding axis, an upper arm provided on the head carriage body to have an upper magnetic head on its lower surface, and a plurality of bearing members each having an annular bearing portion and a mounting arm, the annular bearing portion into which a guiding shaft is inserted along the guiding axis, the mounting arm portion extending outwardly from the annular bearing portion, the mounting arm portion of each of the bearing members being fixed to the head carriage body such that the annular bearing portions are located laterally from the head carriage body. The magnetic disk drive apparatus employing this magnetic head carriage device can be constructed to suit the demands in the field, especially one having an overall thickness smaller than that of a conventional magnetic disk drive apparatus.

8 Claims, 5 Drawing Sheets

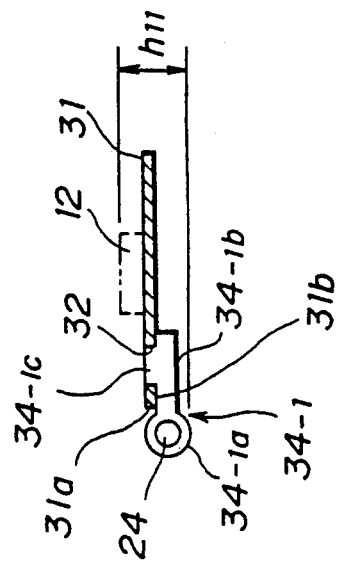
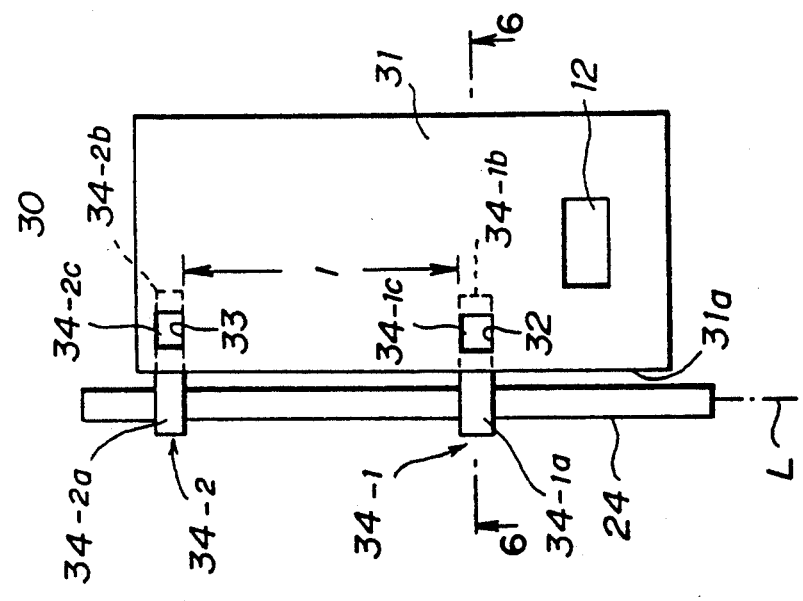

MAGNETIC HEAD CARRIAGE DEVICE FOR MAGNETIC DISK DRIVE

BACKGROUND OF THE INVENTION

The present invention relates to a magnetic head carriage device for a magnetic disk drive apparatus.

In recent years, portable word processers and personal computers are becoming more compact (particularly, thinner). Because of this, magnetic disk drive apparatuses to be incorporated in these word processers and computers are required to be thinner. FIG. 1 shows a magnetic head carriage device 10 according to the prior arts. The magnetic head carriage device has a construction in which a bearing metal 14 is fixedly inserted into an accommodation 13a for the bearing metal, the accommodation being attached to a body 13 of the magnetic head carriage device made of synthetic resin to which a lower magnetic head 12 is provided. The magnetic head carriage device also includes an upper arm 15 and an upper magnetic head 16.

FIG. 2 and FIG. 3 show a cartridge magnetic disk drive apparatus 20 in which the above-mentioned magnetic head carriage device 10 is incorporated. A cartridge 22, in which a magnetic disk 21 is accommodated, is inserted into a cartridge holder 23 as shown by an arrow C and held thereto in a predetermined loading position. In this arrangement, the magnetic disk is rotated by a motor (not shown) and the magnetic head carriage device 10 is moved in two directions as shown by arrows A and B (radial direction of the magnetic disk 21) with the guidance of a guiding shaft 24, thereby the recording and reproducing of information being performed.

The accommodation 13a for the bearing metal should have a certain extent of strength so that it can fixedly receive the bearing metal 14. The portion of the accommodation peripheral to an inserted metal has a relatively large thickness $t_1$, which is in the range of 0.6–1.0 mm.

Because of this, in the magnetic head carriage device 10, the height $h_1$ between a head surface of the magnetic disk 12 and the lower surface thereof is relatively large, which is approximately 4.5 mm.

This also makes the height $h_2$ of the magnetic head carriage device 10 relatively large, which is approximately 16 mm.

Further, in the magnetic disk drive apparatus 20, there is provided a apparatus body 25 which is made through a die casting process, the chassis base 25a must have a predetermined thickness $t_2$ to ensure a certain strength.

Because of this, in the magnetic disk drive apparatus 20 locating the above-mentioned magnetic head carriage device 10 on the chassis base 25a, the height $h_3$ between the magnetic head 12 and the bottom surface and hence the overall height $h_4$ of the apparatus has been made large.

SUMMARY OF THE INVENTION

It is a general object of the present invention to provide an improved magnetic head carriage device for a magnetic disk drive apparatus in which the above described problems are eliminated.

Another and more specific object of the present invention is to provide a magnetic head carriage device which comprises a head carriage body provided on a magnetic disk drive apparatus slidably in a radial direction of a magnetic disk and in parallel to a guiding axis, the head carriage body having a lower magnetic head on an upper surface thereof, an upper arm provided on the head carriage body, the upper arm having an upper magnetic head on a lower surface thereof, the lower magnetic head and the upper magnetic head constituting a magnetic head for the magnetic disk drive apparatus, and a plurality of bearing members each having an annular bearing portion and a mounting arm portion, the annular bearing portion in which a guiding shaft is inserted along the guiding axis, the mounting arm portion extending outwardly from the annular bearing portion, each mounting arm portion of the bearing members being fixed to the head carriage body such that the annular bearing portions of the bearing members are located laterally from the head carriage body. According to the present invention, the height between the upper surface of the lower magnetic head and the lower surface of the head carriage body can be reduced by a certain degree, which has been required for an fixed insertion in the prior art, thereby enabling the thickness of a magnetic head carriage device to become thinner than that of the conventional magnetic head carriage device. Therefore, by applying a magnetic head carriage device according to the present invention to a magnetic disk drive apparatus, it is possible to make the magnetic disk drive apparatus thinner than that of the conventional apparatus.

Other objects and further features of the present invention will become apparent from the following detailed description when read in conjunction with the accompanying drawings.

BRIEF DESCRIPTION OF THE DRAWINGS

FIG. 5 is a plan view showing the body of the magnetic head carriage device of FIG. 4;

FIG. 6 is a sectional view of the magnetic head carriage device taken along a VI—VI line of FIG. 5;

DESCRIPTION OF THE PREFERRED EMBODIMENTS

Figure 1:
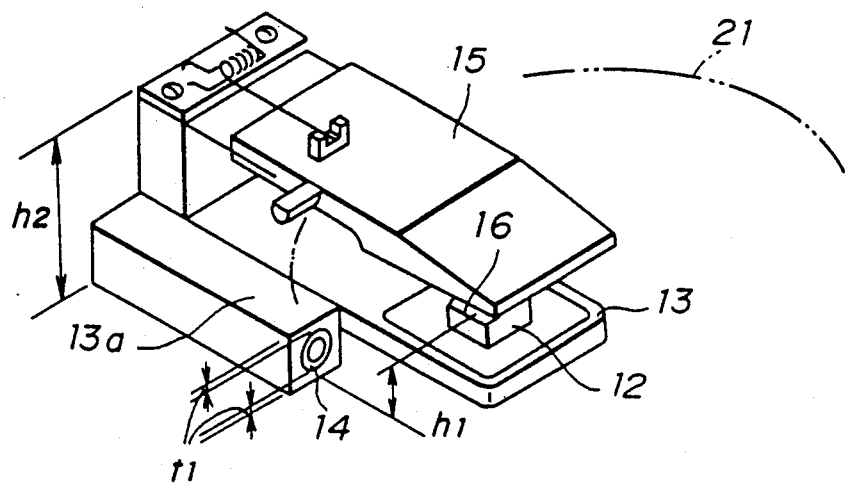
FIG. 1 is a view showing an example of the conventional magnetic head carriage device.
Figure 2:
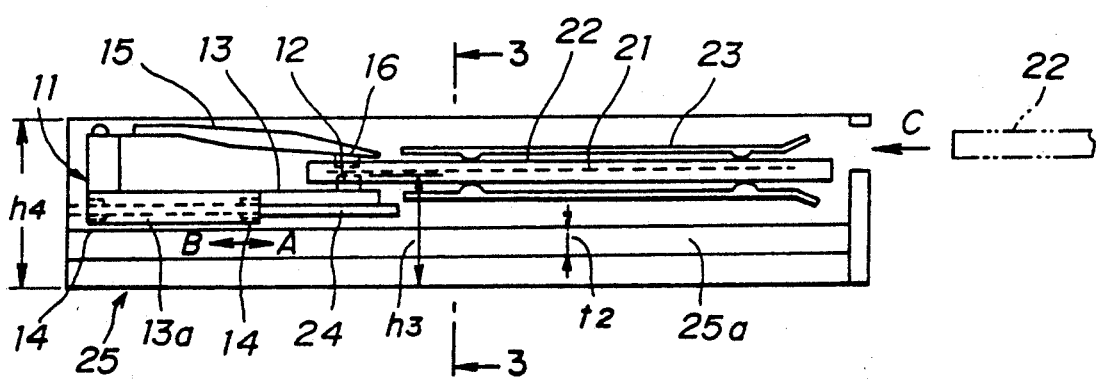
FIG. 2 is a side view showing the construction of a cartridge-type magnetic disk drive apparatus in which the conventional head carriage device shown in FIG. 1 is incorporated.
Figure 3:
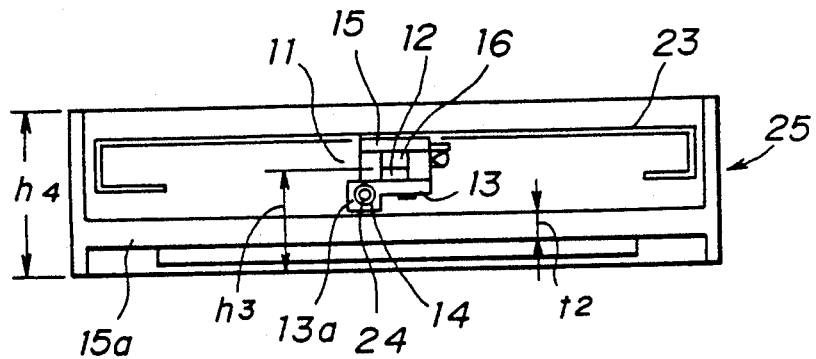
FIG. 3 is a sectional view of the conventional magnetic disk drive apparatus taken along the line III—III of FIG. 2.
Figure 4:
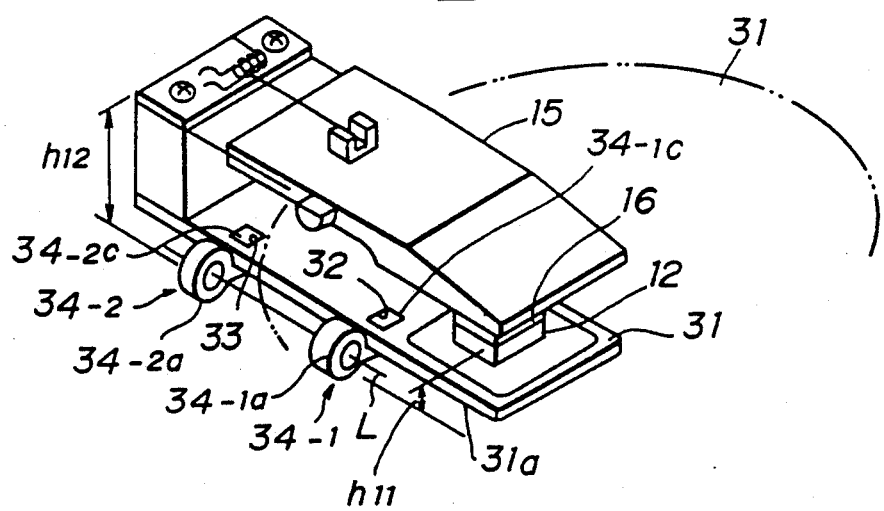
FIG. 4 is a perspective view showing an embodiment of the magnetic head carriage device according to the present invention.

FIGS. 4–6 show an embodiment of a magnetic head carriage device 30 in accordance with the present invention. In these figures, the same reference numerals are used for the components corresponding to those in FIG. 1.

A body of a magnetic head carriage device made of synthetic resin is illustrated by a reference numeral 31, to which a lower magnetic head 12 is attached. On one side of the body of the magnetic head carriage device, rectangular attachment holes 32 and 33 are formed with a predetermined distance "1" between the two holes.

Bearing members made of sintering porous bearing metal are illustrated by numerals 34-1 and 34-2 respectively.

Figure 7:
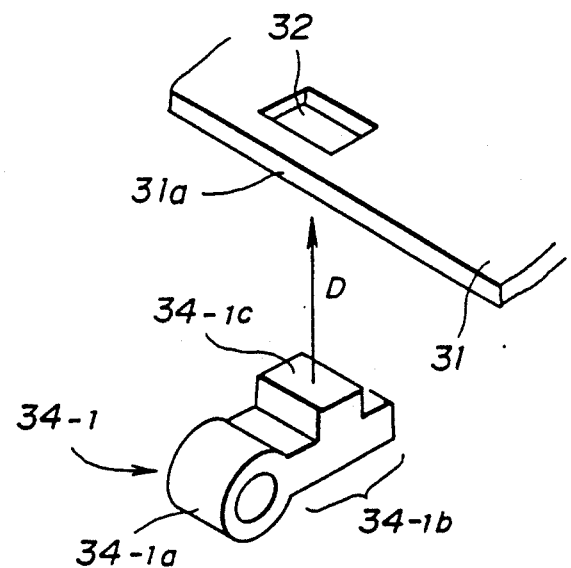
FIG. 7 is an illustrative view showing an attachment of a bearing member in the magnetic head carriage device.

As shown in FIG. 7, the bearing member 34-1 having an annular shape comprises a bearing portion 34-1a into which a guiding shaft 24 is penetrated and an attachment arm 34-1b outwardly extended from the bearing portion 34-1a. On the attachment arm 34-1b, there is provided a projection 34-1c which is upwardly projected to fit to the above-mentioned hole 32.

The other bearing member 34-2 has the same shape as the above-mentioned bearing member 34-1.

The bearing member 34-1 is adhesively fixed to the magnetic head carriage device in a state where, as shown by an arrow D in FIG. 7, its projection 34-1c is fitted into the hole 32 and the arm 34-1b is brought into contact with the bottom surface 31b of the body of the magnetic head carriage device 31. This fixation may be achieved by press fitting or by caulking.

Similarly, the other bearing member 34-2 is fixed to the hole 33 by fitting.

The bearing portions 34-1a and 34-2a are located abutting on the side surface 31a of the body of the head carriage device.

The projections 34-1c and 34-2c of each of the bearing members 34-1 and 34-2 respectively are positioned by the above-mentioned holes 32 and 33 respectively, with the bearing portions 34-1a and 34-2a are aligned with a line L.

In order to attach the bearing members 34-1 and 34-2 to the body 31 of the magnetic head carriage device, the only requirement is that the body be structured to have the holes 32 and 33 in a vertical direction. It is not necessary to make some portions of the body thicker only for the purpose of attaching the bearing members.

In the bearing members 34-1 and 34-2, the bearing portions 34-1a and 34-2a is in a position facing the side surface 31a of the body 31 of the magnetic head carriage device. There is not provided a resin member which surrounds the bearing portions 34-1a and 34-2a.

Because of this, in the above-mentioned magnetic head carriage device 30, the height $h_{11}$ between the head surface of the lower magnetic head 12 and the bottom surface is about 1 mm smaller than the corresponding height $h_1$ of the conventional magnetic head carriage device 10.

Accordingly, the height $h_{12}$ of the magnetic head carriage device 20 becomes about 1 mm smaller than the height $h_2$ of the conventional magnetic head carriage device 10, that is, the magnetic head carriage device 20 comes to have a thinner shape.

Figure 8:
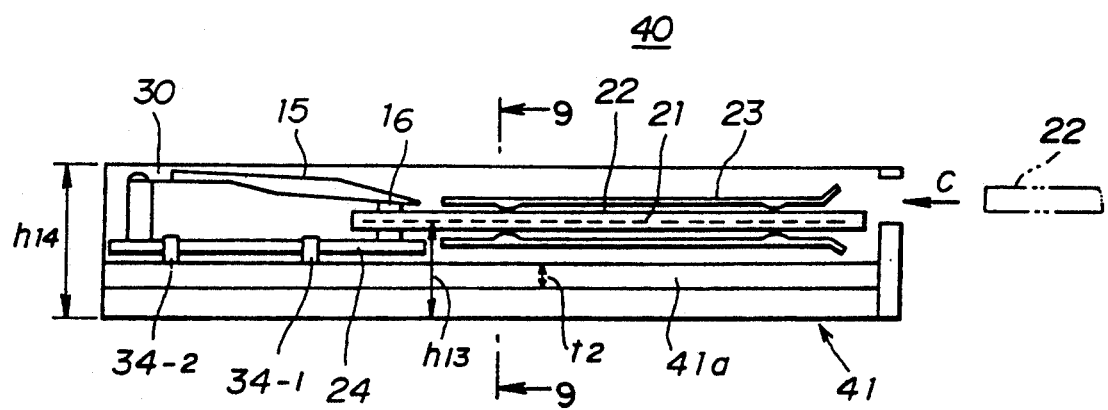
FIG. 8 is a side view showing a cartridge-type magnetic disk drive apparatus in which the magnetic head carriage device of FIG. 4 is incorporated.
Figure 9:
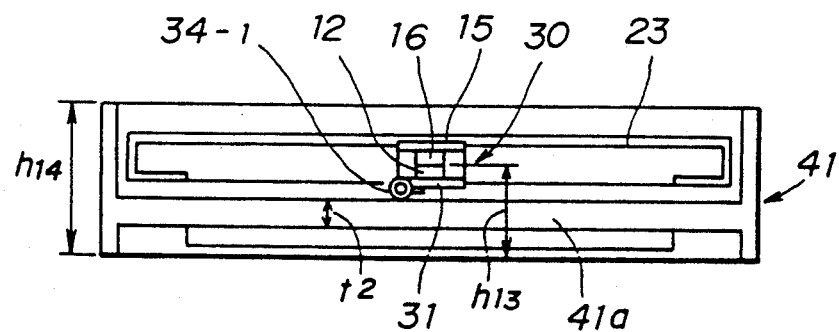
FIG. 9 is a sectional view of the magnetic disk drive apparatus taken along a IX—IX line of FIG. 8.

FIGS. 8 and 9 show a cartridge type magnetic disk drive apparatus in which the above-mentioned magnetic head carriage device 30 is incorporated.

Now, a comparison with the prior art is made with reference to the head surface of the lower magnetic head 12. The shortening of the above-mentioned height $h_{11}$ of the magnetic head carriage device 30 reflects a higher position of the chassis base 41a (which has the same thickness $t_2$ as the conventional chassis base 25a) of the body 41 of the apparatus. This results in a decrease of approximately 1 mm in the height $h_{13}$ between the head surface of the lower head 12 and the bottom surface, thereby reducing the entire height $h_{14}$ by approximately 1 mm when compared with the conventional magnetic disk drive apparatus. Thus the apparatus 40 can be constructed to have a smaller thickness than that of the conventional apparatus.

Figure 10:
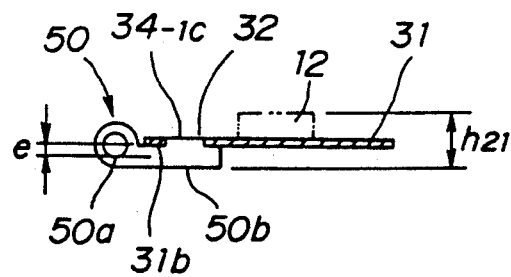
FIG. 10 is a view showing major parts of another embodiment of a magnetic head carriage device according to the present invention.

FIG. 10 illustrates another embodiment of the present invention.

A bearing member 50 has a construction in which an arm 50b extends from a point located under the center of a bearing portion 50a, the distance between the center and the point being indicated as the length e.

This bearing member 50 is attached to the body of the head carriage device in such a manner that a projection 34-1c is fitted into the hole 32 and the arm 50b is fixed to the bottom surface 31b of the body 31 of the magnetic head carriage device.

By using this bearing member 50, the length $h_{21}$, which corresponds the above-mentioned length $h_{11}$, can be reduced.

By incorporating the bearing member 50 in the magnetic head carriage device, the height of a cartridge type magnetic disk drive apparatus can be reduced.

Further, the present invention is not limited to these embodiments, and variations and modifications may be made without departing from the scope of the present invention.

What is claimed is:

1. A magnetic head carriage device for a magnetic disk drive unit, said device comprising:
   a head carriage body provided in the magnetic disk drive unit having an upper magnetic head and a lower magnetic head, said heads being slidable in a radial direction of a magnetic disk and in parallel to a guiding axis, the head carriage body having a lower arm in which the lower magnetic head is mounted on a top surface of the lower arm;
   an upper arm mounted on the head carriage body, the upper arm having a bottom surface on which the upper magnetic head is mounted; and
   a plurality of bearing members for the had carriage body, each of said bearing members having a bearing portion and a mounting arm portion, the bearing portion engaging a guiding shaft for guiding movement of the head carriage body relative to the magnetic disk drive unit along the guiding axis, each of said mounting arm portions of the bearing members extending outwardly from the bearing portion and being fixed to said head carriage body such that the bearing portions of the bearing members are located laterally of the head carriage body, the mounting arm portion extending from a position downwardly deviated from a center of the bearing portion so that a center axis of the guiding shaft is substantially raised above a bottom surface of the bearing members, thereby permitting a reduction in the distance between the top surface of the lower magnetic head and said bottom surface in order to reduce the thickness of the magnetic disk drive unit.

2. The device as claimed in claim 1, wherein two bearing members each having a bearing portion and a mounting arm portion are provided on the head carriage body, the two bearing members being arranged at positions spaced from each other along the guiding axis on one side of the head carriage body.

3. The device as claimed in claim 1, wherein the bearing members are mounted on the head carriage body with the mounting arm portions being fixed to the bottom surface of the head carriage body.

4. The device as claimed in claim 1, wherein the head carriage body has a plurality of openings for mounting the plurality of bearing members, the mounting arm portions of the bearing members each having a projection on their upper surfaces, the projection of one of the mounting arm portions being fitted in one of said openings of the head carriage body for mounting the plurality of bearing members on the head carriage body.

5. The device as claimed in claim 4, wherein the plurality of bearing member are mounted on the head carriage body with the mounting arm portions being fixed to the bottom surface of the head carriage body.

6. The device according to claim 1 wherein said bearing portions of said bearing members are further defined as annular bearing portions.

7. The device according to claim 6 wherein said mounting arm portion of each of said bearing members extends from a position downwardly deviated from the center of the annular bearing portion of the bearing member.

8. The device according to claim 1 wherein said bearing members are made of sintered porous bearing metal.

* * * * *

UNITED STATES PATENT AND TRADEMARK OFFICE
CERTIFICATE OF CORRECTION

PATENT NO. : 5,159,509
DATED : October 27, 1992
INVENTOR(S) : K. Inoue, et al

It is certified that error appears in the above-identified patent and that said Letters Patent is hereby corrected as shown below:

CLAIM 1, Col. 4, Line 43, delete "had" and substitute therefor ---head---.

Signed and Sealed this

Eleventh Day of January, 1994

Attest:

BRUCE LEHMAN

Attesting Officer

Commissioner of Patents and Trademarks